United States Patent [19]

Schellenberg, III

[11] Patent Number: 4,803,793
[45] Date of Patent: Feb. 14, 1989

[54] LIFE LIKE FISHING LURE

[76] Inventor: Fredrick Schellenberg, III, 836 Milford St., Clarksburg, W. Va. 26301

[21] Appl. No.: 136,720

[22] Filed: Dec. 22, 1987

[51] Int. Cl.⁴ ............................................. A01K 85/01
[52] U.S. Cl. ................................... 43/42.33; 43/42.31
[58] Field of Search ................ 43/42.32, 42.33, 42.34, 43/42.35, 42.31

[56] References Cited

U.S. PATENT DOCUMENTS

| | | | |
|---|---|---|---|
| 1,321,850 | 11/1919 | Rhodes | 43/42.33 |
| 2,335,322 | 11/1943 | Taylor | 43/17.6 |
| 2,338,577 | 1/1944 | Divine | 43/42.34 |
| 2,718,725 | 9/1955 | Thurman | 43/42.31 |
| 3,360,882 | 1/1968 | Belokin | 43/42.33 |
| 3,408,764 | 11/1968 | McCurry | 43/42.33 |
| 3,528,189 | 9/1970 | Lilley, Jr. | 43/42.33 |
| 3,935,659 | 2/1976 | McCallum | 43/17.6 |
| 3,935,660 | 2/1976 | Plew | 43/42.31 |

Primary Examiner—Gene P. Crosby
Attorney, Agent, or Firm—Jones, Tullar & Cooper

[57] ABSTRACT

A life like fishing lure includes a transparent hollow body that is shaped like a bait fish, and has composite multiple image photographs of a fish disposed therein, to simulate the appearance of a live fish. The photographs are each composed of at least two images that show the mouth, gills, and fins of the fish in different positions, and are formed using conventional techniques, so that one of the images is viewable from some angles, while the other image is viewable from other angles. This gives the appearance that the photographed fish is actually breathing and swimming as the lure is moved through the water. Additional features of the lure include fluorescent or phosphorescent colored grooves disposed on the top surface thereof to make the lure more visible and a noisemaking rattle to provide an additional attractive effect on fish.

2 Claims, 1 Drawing Sheet

LIFE LIKE FISHING LURE

BACKGROUND OF THE INVENTION

The present invention relates, in general, to a fishing lure that is formed from a transparent body having composite mutiple image photographs of a fish disposed on the inside thereof to provide a fishing lure that appears to be a live, breathing, and swimming bait fish.

Many attempts have been made in the past to design fishing lures which are attractive to fish. The most basic approach has been to design the fishing lure so that it resembles, or behaves like, live bait. As an example of such a lure, U.S. Pat. No. 3,528,189 to Lilley, discloses a fishing lure that is formed of a clear plastic housing, and has an actual photograph of a bait fish disposed on the inside thereof. This provides a fishing lure that simulates the appearance of an actual bait fish. However, since Lilley makes use of a single still image photograph of a fish, there is no way to make the fish in the photograph actually appear to be breathing and swimming. Lilley instead makes use of reflective material inside the lure to provide an additional means to attract fish.

SUMMARY OF THE INVENTION

It is therefore the object of the present invention to provide a life like fishing lure which both appears and behaves like live bait so that it will be very attractive to fish.

It is another object of the present invention to provide a life like fishing lure which both appears and behaves like live bait, and further includes additional fish attracting features.

It is yet another object of the invention to provide a life like fishing lure which can be easily seen in the water by a fisherman using the lure.

These, and other objects of the invention are achieved through the use of a fishing lure having a transparent hollow body that is shaped generally like a small bait fish, and has composite multiple image photographs of a bait fish disposed on the inside thereof. The multiple image photographs are formed from a plurality of negatives that show a fish in different positions. For example, a first negative can be taken showing a fish with its mouth and gills open, and its fins in a first position, while a second negative can be taken showing the same fish with its mouth and gills closed, and its fins in a second position.

The multiple images are then superimposed over one another, and the composite photograph is formed using any suitable known technique (e.g., polarization, lenticular lens array, diffraction grating) so that one of the images is visible when viewing the photograph from one angle, while the other image is visible when viewing the photograph from another angle. In this manner, when the fishing lure is moved through the water, the changing images will provide the appearance of a live bait fish with moving gills, fins, and mouth.

To further provide an attractive effect to fish, the lure is also provided with a noise making rattle that can be conveniently disposed inside the body of the lure.

Finally, one or more grooves can be disposed along the top side of the lure that are painted or marked with a fluorescent or phosphorescent color so that the lure will be easily visible to a fisherman.

BRIEF DESCRIPTION OF THE DRAWINGS

The foregoing objects, features, and advantages of the present invention will become apparent from a consideration of the following detailed description of a preferred embodiment thereof taken in conjunction with the accompanying drawings, in which.

DETAILED DESCRIPTION OF THE PREFERRED EMBODIMENT

Figure 1:
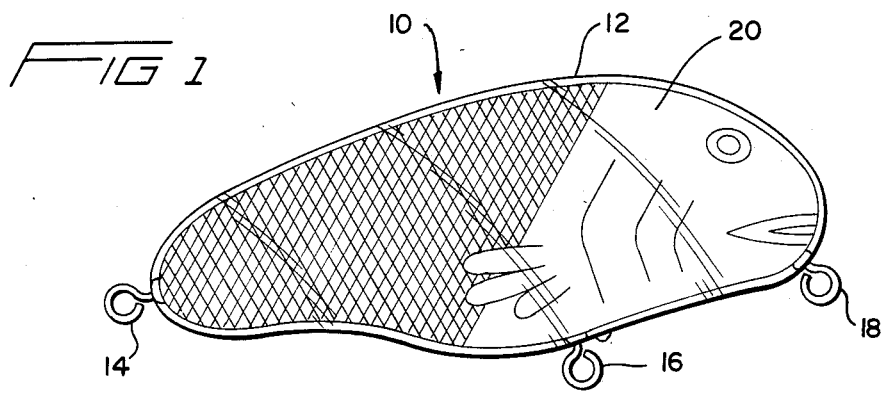
FIG. 1 is a side elevation of a fishing lure constructed in accordance with the present invention.
Figure 2:
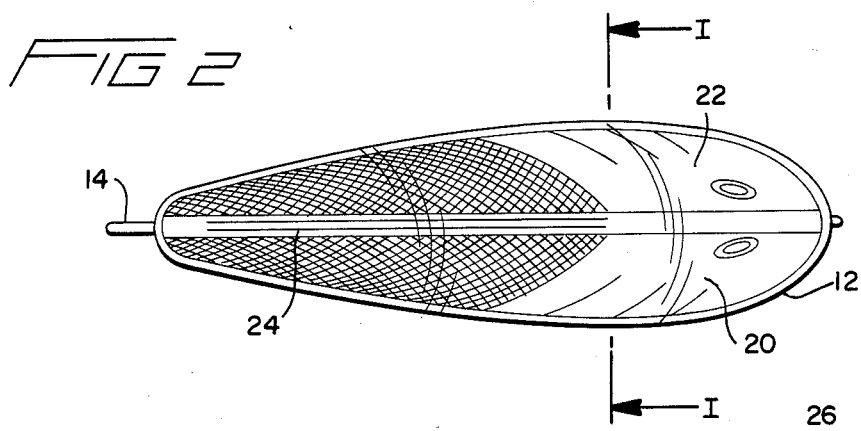
FIG. 2 is a top view of the fishing lure.

Turning now to a more detailed consideration of the preferred embodiment, there is illustrated in FIG. 1, a fishing lure 10, including a transparent hollow body 12 that is formed generally in the shape of a bait fish. As is conventional, a plurality of eyelets 14, 16, and 18, are disposed along body 12 for the reception of hooks and line. A first composite multiple image photograph 20 of the right hand side of a bait fish is disposed within body 12 so as to be visible from outside the right hand side of the lure 10 as shown. Similarly, as illustrated in FIG. 2, a composite multiple image photograph 22 of the left hand side of a bait fish is disposed within body 12 to be visible from the left hand side of the lure 10.

Disposed along the center of the topside of body 12, are one or more grooves 24, which are painted or marked with a fluorescent or phosphorescent color to enable lure 10 to be easily visible to a fisherman.

Figure 3A:
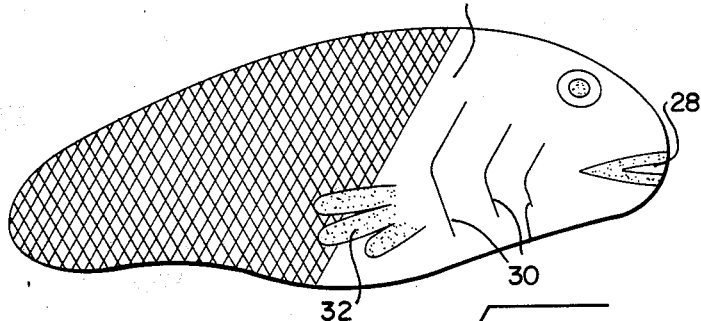
FIG. 3a is a plan view of a first image of a bait fish that is used to make a composite multiple image photograph.

Turning now to FIG. 3a, there is illustrated a first image 26 which forms a part of composite multiple image photograph 20 of the right hand side of a bait fish. The fish in the image includes a mouth 28, gills 30, and pectoral fins 32, and as shown, the mouth and gills are closed, and the fins are swept back.

Figure 3B:
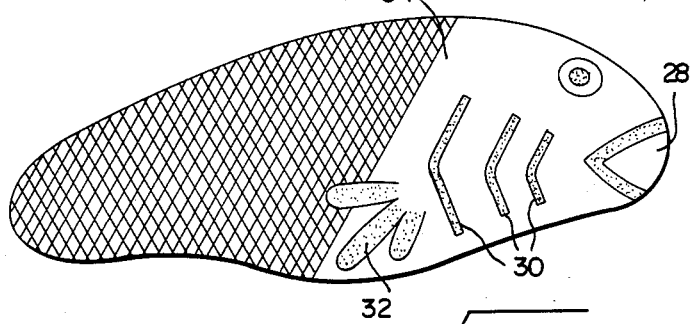
FIG. 3b is a plan view of a second image of a bait fish that is used to make a composite multiple image photograph; and, FIG. 4 is a cross sectional view of the fishing lure taken along line I—I of FIG. 2.

In FIG. 3b, a second image 34 is shown which also forms a part of composite multiple image photograph 20. As can be seen, image 34 differs from first image 26 in that in image 34, mouth 28 and gills 30 are open, and fins 32 are pointed downwardly.

Images 26 and 34 are superimposed, and by using any conventional technique, such as polarization, lenticular lenses, or diffraction gratings, the composite multiple image photograph 20 can be obtained which, when viewed from some angles will appear like image 26, and when viewed from other angles, will appear like image 34. It should be understood that composite multiple image photograph 22 of the left hand side of the bait fish will be formed in the same manner. The result of this effect is that when lure 10 is moved on a line through the water, the fish in the photographs will appear to have a moving mouth, gills, and fins. Thus a life like appearance will be created that will be attractive to fish.

It should be understood that the use of two images to form the composite multiple image photographs is provided solely as an example, and more than two images could be combined to form the composite multiple image photographs if desired to further enhance the life like appearance of the same.

Figure 4:
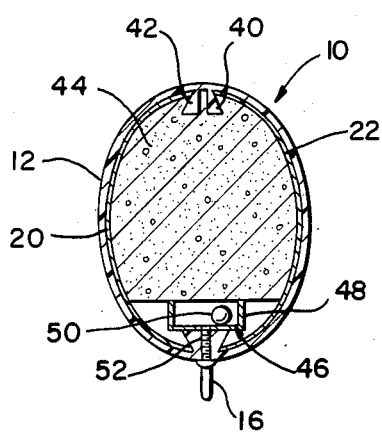

Turning now to FIG. 4, a cross sectional view of fishing lure 10 is shown. Disposed within body 12 of lure 10, are composite photographs 20 and 22. A pair of tabs 40 and 42 depend from the inner top surface of body 12 to provide a means by which photographs 20 and 22 can be retained against the inner surface of body 12.

A body of foam material 44, substantialy fills the interior of body 12, to provide an additional means by which photographs 20 and 22, are retained against the inner wall of body 12. This foam material can be either injected into an aperture in body 12, or alternatively, body 12 can be formed by two halves, and the foam material can be inserted into the halves in solid form before final assembly of the lure.

Disposed within the bottom of the interior of body 2, is a noise making rattle 46, which includes a housing 48, a ball 50 disposed within housing 48, and a screw 52 for attaching rattle 46 to body 12. Preferably, the head of screw 52 forms eyelet 16. Since the rattle 46 is disposed beneath the foam material 44, the noise it makes is projected downwardly. The rattle thus serves as an additional means to attract fish as the lure 10 is moved through the water. Alternatively, the rattle can be designed to cause the lure 10 to vibrate as it moves through the water to further enhance its life like appearance.

Although the invention has been illustrated in terms of a preferred embodiment, it will be understood that numerous variations and modifications can be made by those of skill in the art without departing from the true spirit and scope of the inventive concept as set forth in the following claims. For example, the composite multiple image photographs could include variable color patterns to act as a further attracting means. Also, other types of photographs could be employed such as three dimensional photographs, to further enhance the life like effect.

What is claimed is:

1. A fishing lure for providing a life like simulation of live bait comprising:

A hollow transparent lure body formed in the shape of a bait fish;

first and second photographs of a live bait fish disposed within said lure body, said first photographs being visible from outside a first side of said lure body, and, said second photograph being visible from outside a second side of said lure body;

a noise making rattle disposed within a bottom portion of the lure body for attracting fish;

means to retain said photographs against an inner wall of said lure body, and to cause the sound of said noise making rattle to be projected downwardly from the bottom of said lure body, said means comprising a body of foam material which substantially fills the interior of said lure body; and, means to enable the lure body to be easily visible to a fisherman, said means comprising a fluorescent or phosphorescent colored groove disposed along a center of a topside of said body.

2. The fishing lure of claim 1 wherein said first and second photographs are each composite multiple image photographs that illustrate a fish in different positions and give the illusion of a swimming and breathing fish when viewed from differing angles.

* * * * *